June 27, 1967 W. F. GRATTAN 3,327,565
AUTOMATIC TRANSMISSION FOR AUTOMOTIVE VEHICLES
Filed March 9, 1965 4 Sheets-Sheet 1
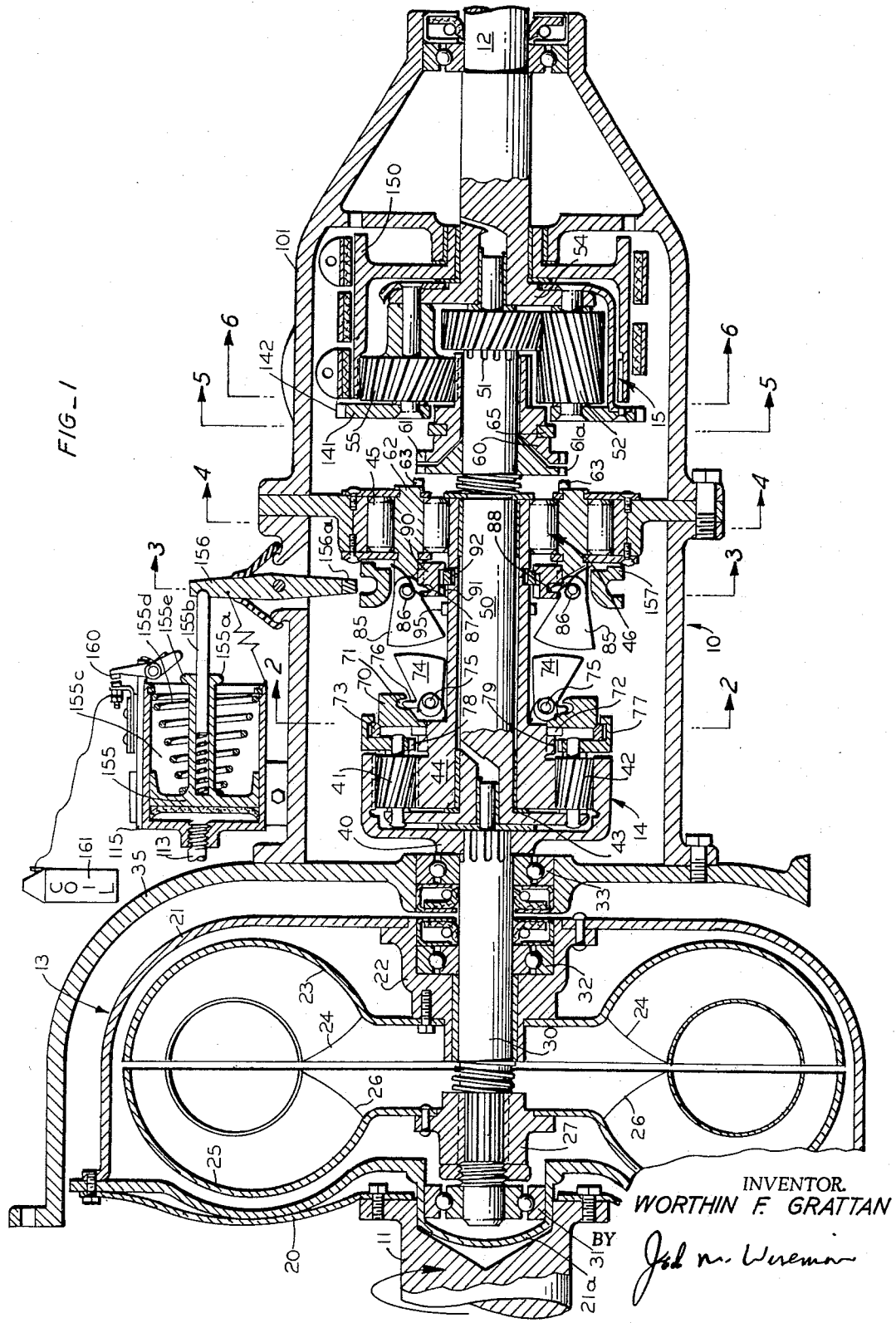
INVENTOR.
WORTHIN F. GRATTAN
BY June 27, 1967     W. F. GRATTAN     3,327,565
AUTOMATIC TRANSMISSION FOR AUTOMOTIVE VEHICLES
Filed March 9, 1965     4 Sheets-Sheet 2
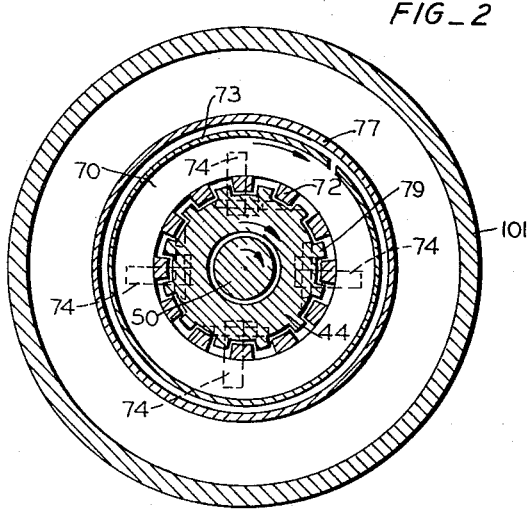
FIG_2
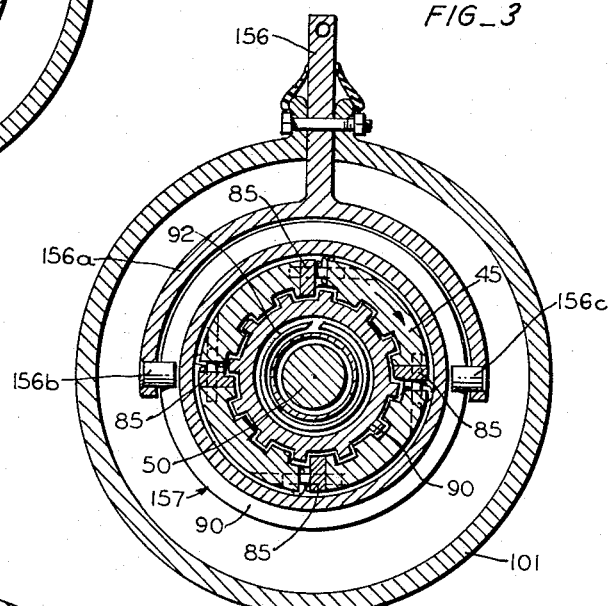
FIG_3
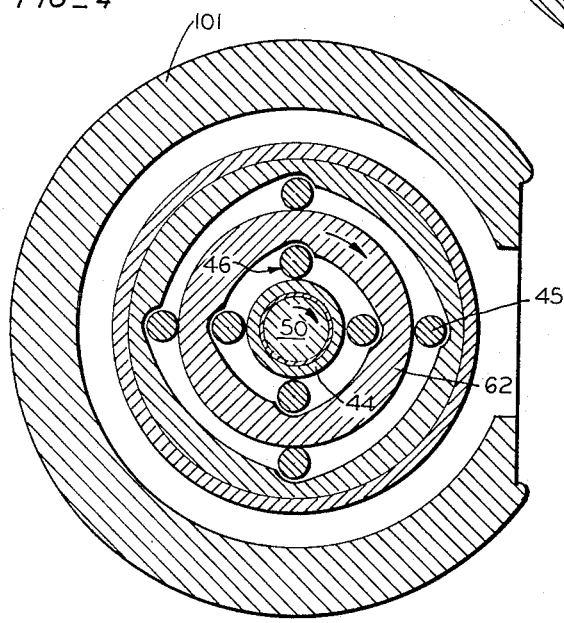
FIG_4
INVENTOR.
WORTHIN F. GRATTAN
BY *Jack M. Wiseman*

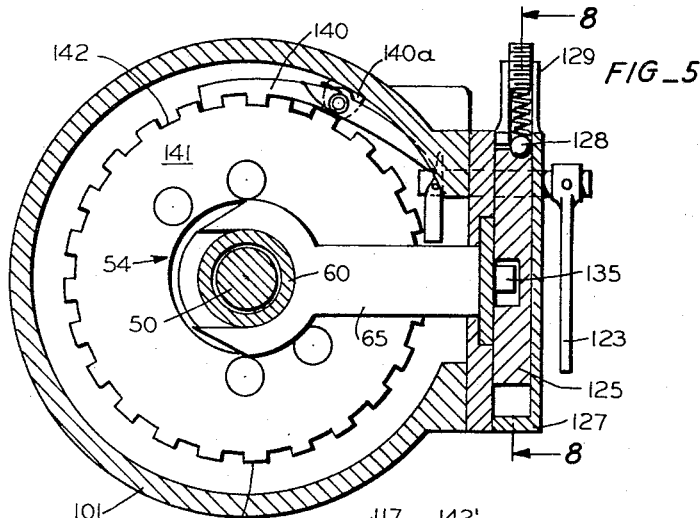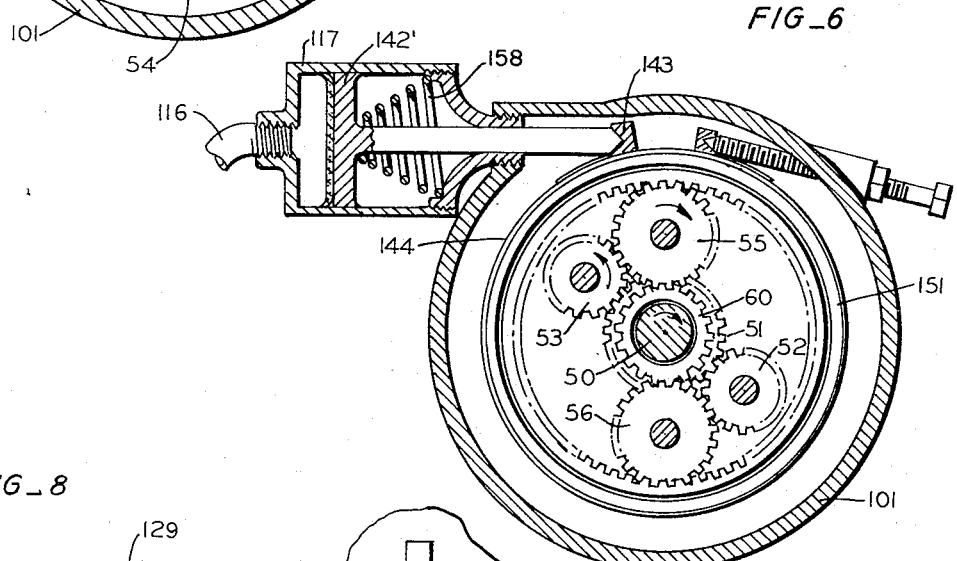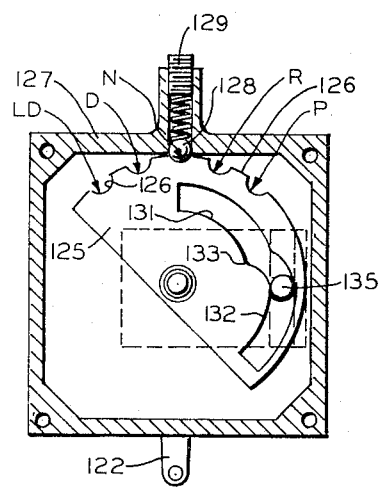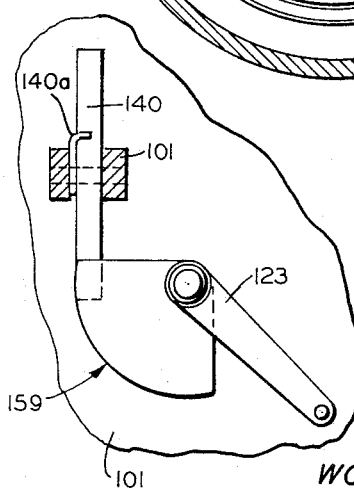

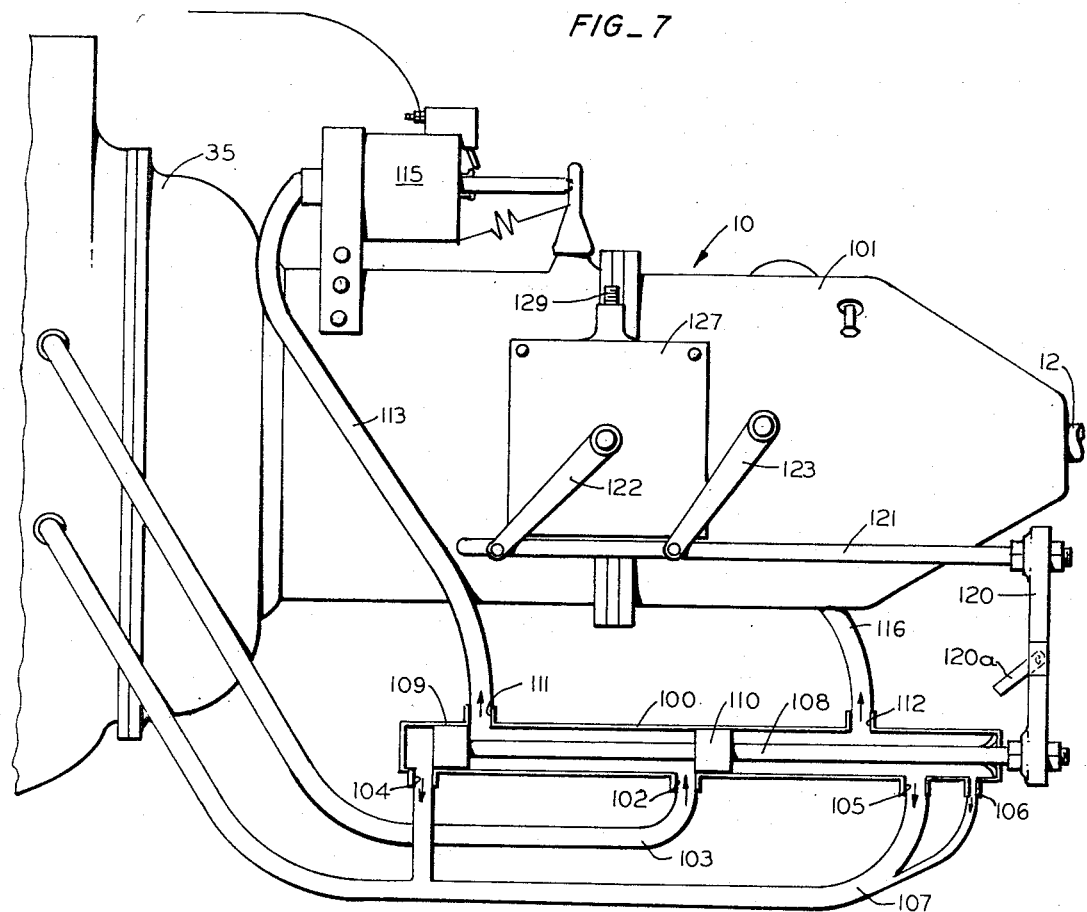
FIG_7
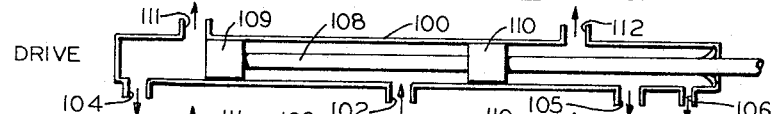
FIG_7A  DRIVE
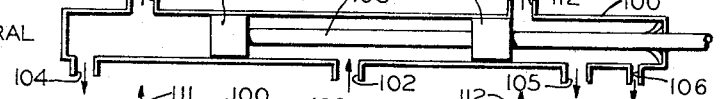
FIG_7B  NEUTRAL
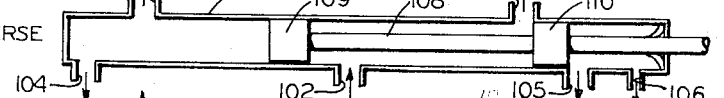
FIG_7C  REVERSE
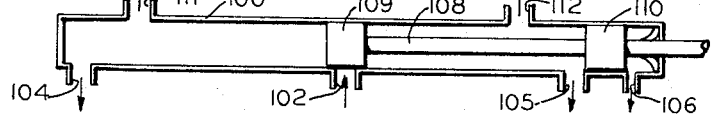
FIG_7D  PARK
INVENTOR.
WORTHIN F. GRATTAN
BY Jack M. Wrenn

United States Patent Office 3,327,565
Patented June 27, 1967

3,327,565
AUTOMATIC TRANSMISSION FOR
AUTOMOTIVE VEHICLES
Worthin F. Grattan, 22450 Summit Road,
Los Gatos, Calif. 95030
Filed Mar. 9, 1965, Ser. No. 438,358
9 Claims. (Cl. 74—752)

ABSTRACT OF THE DISCLOSURE

An automatic transmission in which the drive shaft is coupled to the driven shaft via a fluid coupling, a forward planetary gear, and a rear planetary gear. The fluid coupling acts as a clutch with 100% slippage at slow engine speeds, the slippage decreasing to zero as the engine speed increases. At speeds less than 15 m.p.h., the gears impose an accumulative reduction. At speeds between 15 and 25 m.p.h., the forward gear locks up so that reduction is provided by the rear gear only. And at speeds greater than 25 m.p.h. both gears lock up to place the transmission in direct drive. Manual shift lever means are provided to lock up the rear gear for reverse drive and for parking.

---

The present invention relates to automatic transmissions for automotive vehicles.

An object of the present invention is to provide an automatic transmission for an automotive vehicle in which the durability thereof is improved by the elimination of friction clutches.

Another object of the present invention is to provide an automatic transmission for an automotive vehicle that is more economical to manufacture without omitting desirable features.

Another object of the present invention is to provide an automatic transmission for automotive vehicles in which the wear, tear, strain and breakage of the components thereof are reduced by gear lock-up at engine idling speed.

Another object of the present invention is to provide an automatic transmission for automotive vehicles in which the fuel consumption for operating the vehicle is reduced. Another object of the present invention is to provide an automatic transmission for automotive vehicle that can be towed out of gears at any speed without lifting the drive wheels from a supporting surface.

Another object of the present invention is to provide an automatic transmission for automotive vehicles that can be started by pushing the vehicle.

Another object of the present invention is to provide an automatic transmission for automotive vehicles that can be locked in second for down hill braking.

Another object of the present invention is to provide an automatic transmission for automotive vehicles that is independent of electrical connections.

Other and further objects and advantages of the present invention will be apparent to one skilled in the art from the following description taken in connection with the accompanying drawings, in which:

FIG. 1 is a diagrammatic longitudinal section of an automatic transmission embodying the present invention.

FIG. 2 is a transverse section view taken along line 2—2 of FIG. 1.

FIG. 3 is a transverse section view taken along line 3—3 of FIG. 1.

FIG. 4 is a transverse section view taken along line 4—4 of FIG. 1.

FIG. 5 is a transverse section view taken along line 5—5 of FIG. 1.

FIG. 6 is a transverse section view taken along line 6—6 of FIG. 1.

FIG. 7 is a diagrammatic side elevation of the automatic transmission embodying the present invention.

FIGS. 7A–7D are diagrammatic illustrations of engine oil flow paths under respective transmission conditions for the automatic transmission shown in FIGS. 1 and 7.

FIG. 8 is a sectional view taken along line 8—8 of FIG. 5.

FIG. 9 is a fragmentary elevation view partially in section of the park lever arrangement with portion of the transmission broken away to illustrate the pawl actuated by the park lever.

Illustrated in FIG. 1 is the automatic transmission 10 of the present invention, which is employed to establish a drive relationship between a drive shaft 11, such as an engine crankshaft of a vehicle, and a driven shaft 12. The driven shaft 12 is axially aligned with the drive shaft 11 and is connected through suitable differential gears, not shown, to the rear wheel of a vehicle for applying a torque thereto.

The transmission 10 includes a fluid coupling main engine clutch through a conventional fluid coupling 13. In series with the fluid coupling 13 and axially aligned therewith are axially aligned forward planetary gear 14 and rear planetary gear 15. It is intended that the forward planetary gear 14 automatically lock-up when the speed of travel of the vehicle exceeds in the preferred embodiment 15 miles per hour. This action for the transmission 10 will be similar to shifting into second in a manually operated shift. Further, it is intended to lock up automatically the rear planetary gear 15 when the speed of travel of the vehicle exceeds in the preferred embodiment 25 miles per hour. When the speed of travel of the vehicle exceeds 25 miles per hour, both the forward planetary gear 14 and the rear planetary gear 15 will lock-up. This action places the transmission 10 in a high or direct drive. Thus, in the acceleration of the vehicle, the forward planetary gear 14 automatically locks-up prior to the automatic locking-up of the rear planetary gear 15. The automatic locking-up of the planetary gears 14 and 15 at the respective speeds occurs after the vehicle attains the required speed of travel and the accelerator pedal is momentarily released.

Locking arrangements are provided for the rear planetary gear 15 to enable an operator to manually operate a shift lever to lock-up the rear planetary gear 15 for reverse drive and for parking.

When the driving shaft 11 is rotated, its torque can be multiplied by the planetary gears 14 and 15 for transmission to the driven shaft 12. Alternatively, a direct drive with no torque multiplication can be established between the driving shaft 11 and the driver shaft 12 through the fluid coupling 13 by by-passing the planetary gears 14 and 15. When decelerating to stop, the planetary gears 14 and 15 unlock automatically and the power is transmitted through the planetary gears 14 and 15, since the transmission 10 is in low gear. The manual shift positions for the transmission 10 of the present invention are low drive, drive, neutral, reverse, and park.

A disc 20 is secured adjacent the central opening thereof to the drive shaft 11 by bolts for rotation therewith. At the peripheral edge thereof, the disc 20 is fixed by bolts to the housing 21 of the fluid coupling 13. The housing has a hub 22 fixed thereto. An arcuate inner wall 23 is fixedly secured to the hub 22 by bolts. Thus, rotation of the shaft 11 imparts rotation to the disc 20, which, in turn, rotates the housing 21 therewith. The rotation of the housing 21 imparts rotation to the hub 22, which rotates the arcuate inner wall 23 about an axis aligned with the axes of the drive shaft 11 and the driven shaft 12.

Fixed to the arcuate inner wall 23 for rotation therewith are a plurality of drive or pump vanes 24 having configurations similar to fan blades. Confronting the arcuate inner wall 23 is a complementary arcuate inner wall 25. The arcuate inner walls 23 and 25 are disposed with the sealed housing 21, which contains a supply of light oil. Generally, the light oil is sufficient to exceed the capacity of the confronting inner walls 23 and 25.

Runner or turbine vanes 26, which are similar in construction to fan blades, are fixedly secured to the arcuate inner wall 25 for imparting rotation thereto about an axis aligned with the axes of the drive shaft 11 and the driven shaft 12. Bolted to the inner wall 25 is a hub 27, which rotates with the inner wall 25.

Received by the hubs 22 and 27 and axially aligned with the drive shaft 11 and the driven shaft 12 is a stub or intermediate shaft 30. One end of the shaft 30 is supported by the hub end 21a of the housing 21 through suitable bearing 31. Adjacent the bearings 31, the shaft 30 is splined, whereby rotation of the hub 27 imparts rotation to the shaft 30. Intermediate the ends of the shaft 30 are disposed suitable bearings 32, which are surrounded by the hub 22. The arcuate wall 23 and the hub 22 are freely rotatable about the shaft 30. Suitable bearings 33 also surround the shaft 30 adjacent the bearings 32 and are received by the hub of a transmission housing 35, which remains stationary.

Accordingly, the drive shaft 11 rotates the disc 20 about the axis of the shaft 30, which, in turn, rotates the housing 21 about the axis of the shaft 30. By rotating the housing 21, the inner wall 23 is rotated therewith about the axis of the shaft 30 through the hub 22. When the inner wall 23 rotates the drive vanes 24 rotate therewith to impel oil across the turbine vanes 26. This action causes the inner wall 25 to rotate about the axis of the shaft 30, which in turn imparts rotary movement to the shaft 30 about its axis through the hub 27.

The fluid coupling 13 acts as a clutch. At a very slow engine speed there can be a 100% slippage. As the engine speed increases, the amount of slippage decreases. When the engine speed is high, the amount of slippage approaches a zero slippage.

Fixed to the shaft 30 for rotation therewith is a ring gear 40 of the forward planetary gear 14. Meshing with the ring gear 40 are diametrically opposite pinion or planet gears 41 and 42, which are carried for rotation about their respective axes by a planet carrier 43. Also, meshing with the pinion gears 41 and 42 is a sun gear 44. One-way brakes 45 and 46 make contact with the collar of the sun gear 44 to hold the sun gear 44 against rotation in the counterclockwise or reverse direction as viewed in FIG. 2. Thus, rotation of the ring gear 40 with the shaft 30 imparts rotation to the pinion gears 41 and 42. With the sun gear 44 held from counterclockwise rotation by the one-way brakes 45 and 46, the pinion gears 41 and 42 and the planet carrier 43 will rotate in the clockwise direction as viewed in FIG. 2.

An intermediate or stub shaft 50 is fixed at one end thereof to the planet carrier 43, whereby rotation of the planet carrier 43 imparts rotation to the stub shaft 50. The stub shaft 50 is axially aligned with the drive shaft 11, the driven shaft 12 and the intermediate shaft 30.

Secured to the opposite end of the shaft 50 for rotation therewith is a sun gear 51 of the rear planetary gear 15. Meshing with the sun gear 51 are diametrically opposite pinion or planet gears 52 and 53 (FIGS. 1 and 6), which are carried by a planet carrier 54 for rotation about their respective axes. In turn, the pinion gears 52 and 53 mesh with planet gears 55 and 56, which are also carried by the planet carrier 54 for rotation about their respective axes. When compared against one another, the pinion gears are long and smaller diameter, while the planet gears are short and longer diameter. The planet carrier 54 is fixed to the driven shaft 12, whereby rotation of the planet carrier 54 imparts rotation to the driven shaft 12.

As shown in FIGS. 1 and 6, a sun reactor gear 60 meshes with the planet gears 55 and 56. The sun reactor gear 60 is mounted at its hub portion for the free rotation about the shaft 50, and is slidable in an axial direction relative to the axis of the shaft 50.

The sun gear 51 rotating clockwise serves to rotate the pinion gears 52 and 53 in the counterclockwise direction (FIG. 6), which in turn serve to rotate the planet gears 55 and 56 in the clockwise direction (FIG. 6). When the sun reactor gear 60 is out of meshing engagement with the planet gears 55 and 56, the planet gears 55 and 56 and the pinion gears 52 and 53 are freely rotatable about their respective axis. Under this condition, the transmission 10 is out of gear.

Formed at the forward end of the sun reactor gear 60 are teeth 61 and formed on the rearward wall of a disc 62 of the one-way brake 45 are teeth 63. Interposed between the disc 62 and the reactor gear 60 is a synchronizing ring 61a. The teeth 61 of the reactor gear 60 first mesh with the teeth of the synchronizing ring 61a and then mesh with the teeth 63 of the disc 62. A shifting fork 65 (FIGS. 1 and 5) is received by a peripheral groove in the sun reactor gear 60 for shifting the same axially relative to the shaft 50. When the sun reactor gear 60 is shifted forwardly, the teeth 61 thereof mesh with the teeth 63 of the one-way brake 45. Under this condition, the transmission 10 is in drive and the sun reactor gear 60 is held by the one-way brake 45 against counterclockwise or reverse rotation (FIGS. 4 and 6).

While the sun reactor gear 60 is held against counterclockwise rotation (FIGS. 4 and 6) by the one-way brake 45, the sun gear 51 rotates the pinion gears 52 and 53 in the counterclockwise direction (FIG. 6). In turn, the pinion gears 52 and 53 impart clockwise rotary movement to the planet gears 55 and 56. Thereupon, the planet gears 55 and 56 travel in an epicyclic manner about the sun reactor gear 60 in a clockwise direction (FIG. 6). As a consequence thereof, the planet carrier 54 is rotated in the clockwise direction (FIG. 6) to impart rotation to the driven shaft 12.

The speed of rotation of the planet carrier 54 is less than the speed of rotation of the sun gear 51 and the transmission 10 is at low gear. The revolutions per minute of the driven shaft 12 is less than the revolutions per minute of the drive shaft 11.

Disposed adjacent the forward planetary gear 14 and encircling the sun gear 44 is a locking ring 70, which is slidable in an axial direction relative to the shaft 50 and rotates with the sun gear 44. Formed in the locking ring 70 is an annular groove 71 and projecting from the locking ring 70 is an annular set of teeth 72. Adjacent to the locking ring 70 is a split synchronizing ring 73 (FIG. 2). Attached to the sun gear 44 is a plurality of forward centrifugal weights 74 (FIGS. 1 and 2), which are individually tensioned by springs 75. Projecting from the centrifugal weights 74 are actuating fingers 76, which are received by the annular groove 71 of the locking ring 70 and serve to slide the locking ring 70 in the axial direction. Mounted on the planet carrier 43 adjacent the locking ring 70 is a mating ring 77 formed with an annular set of teeth 78. Formed on the sun gear 44 is an annular set of splines 79 to receive the locking ring 70 for rotation therewith.

When the centrifugal weights 74 are in the position shown in FIG. 1, the locking ring 70 is in the disengaged position. When the speed of travel of the vehicle exceeds 15 miles per hour, the centrifugal weights 74 pivot radially outward or are thrown out against the urgency of the respective springs 75 causing the fingers 76 to slide the locking ring 70 axially toward the drive shaft 11 after the accelerator pedal is temporarily released for reverse power flow in a manner hereinafter described. This action slides the locking ring 70 into the split synchronizing ring 73 to expand it. Further sliding movement of the locking ring 70 in the same direction causes the teeth 72 to mesh with the teeth of the mating ring 77 that is secured to the planet carrier 43. As the locking ring 70 meshes with the mating ring 77, it rides in the splines 79 formed in the sun gear 44. Thus, when the locking ring 70 is positioned in the splines 79 of the sun gear 44 and meshes with the teeth of the mating ring 77 on the planet carrier 43, the planet carrier 43 and the sun gear 44 are locked together by the locking ring 70 and the shaft 50, the sun gear 44, the planet carrier 43 and the locking ring 70 rotate in unison. When the vehicle speed is reduced below 15 miles per hour, the centrifugal weights will return to the position shown in FIG. 1.

Initially, the vehicle is stopped and the engine is idling. Then, the manually operated shift lever is actuated to a drive position and the shift fork 65 moves the sun reactor gear 60 forwardly to mesh with the teeth of the one-way brake 45. At this time, there is a 100% slippage in the fluid coupling 13. Now, the engine is accelerated and the turbine vanes 26 and the inner arcuate wall 25 begin to rotate the shaft 30 in a manner previously described.

When the vehicle speed is above 15 miles per hour, the operator releases momentarily the accelerator pedal. As a consequence thereof, a reverse power flow through the transmission 10 is temporarily obtained, since the momentum of the vehicle causes the driven shaft 12 to function as a drive element. The sun reactor gear 60 that was held against counterclockwise rotation by the one-way brake 45 is now urged to rotate in the clockwise direction. Hence, the sun reactor gear 60, the one-way brake 45, the one-way brake 46 and the sun gear 44 rotate in unison in the clockwise direction.

At this time, the centrifugal weights 74 pivot radially outward against the urgency of the springs 75. Thereupon, the locking ring 70 slides forwardly in the axial direction and expands the synchronizing ring 73. Continued axial movement of the locking ring 70 causes the teeth 72 thereof to mesh with the teeth of the mating ring 73. In addition, the locking ring 70 slides over the splines 79 of the sun gear 44. Hence, the sun gear 44, the locking ring 70 and the planet carrier 43 through the mating ring 77 are locked together to rotate in unison. The only reduction in the speed of rotation is through the rear planetary gear 15 and the transmission 10 is said to be in second.

Attached to the forward end of the one-way brake 45 are a plurality of centrifugal weights 85 (FIGS. 1 and 3), which are tensioned by respective springs 86. When the vehicle travelled at a rate of speed 15 miles per hour, the centrifugal weights 74 were able to overcome the tension of the springs 75. The centrifugal weights 85, however, remain in the position shown in FIG. 1 and do not overcome the tension of the springs 86. When the vehicle travels at the rate of speed of 25 miles per hour, the centrifugal weights 85 pivot radially outward or throw out against the urgency of the springs 86.

Formed on the centrifugal weights 85 and projecting therefrom are fingers 87 that are disposed within an annular groove 88 of a locking ring 90. Formed on the locking ring 90 is an annular set of teeth 91. The locking ring 90 when actuated moves in the axial direction relative to the shaft 50. When the centrifugal weights 85 are moved radially outward against the urgency of the springs 86, the fingers 87 thereof slide the locking ring 90 forwardly in the axial direction relative to the shaft 50 after the accelerator pedal is temporarily released for reverse power flow in a manner hereinafter described. Adjacent the locking ring 90 and mounted on the collar of the sun gear 44 is a synchronizing ring 92, which is disposed in the path of travel of the locking ring 90 and is compressed as the locking ring 90 is moved forwardly by the fingers 87 of the centrifugal weights 85.

Formed in the collar of the sun gear 44 is an annular set of teeth 95. As the locking ring 90 continues to advance forwardly in the axial direction of the shaft 50 under the action of the fingers 87 of the centrifugal weights 85, the teeth 91 of the locking ring 90 mesh with the teeth 95 of the collar of the sun gear 44.

When the vehicle speed is above 25 miles per hour, the operator releases momentarily the accelerator pedal. As a consequence thereof, a reverse power flow through the transmission 10 is temporarily obtained, since the momentum of the vehicle causes the driven shaft 12 to function as a drive element. The sun reactor gear 60 that was held against counterclockwise rotation by the one-way brake 45 is now urged to rotate in the clockwise direction. Hence, the sun reactor gear 60, the one-way brake 45, and the one-way brake 46 rotate in unison.

As previously described for the condition when the vehicle had reached the speed of 15 miles per hour, the sun gear 44, the locking ring 70 and the planet carrier 43 through the mating ring 77 were locked together to rotate in unison and the only reduction in the speed of rotation was through the planetary gear 15.

Now, the sun reactor gear 60 is rotating clockwise in a manner previously described for the reverse power flow at the speed of 25 miles per hour. As the speed of the vehicle exceeds 25 miles per hour, the centrifugal weights 85 move radially outward against the urgency of the springs 86. The fingers 87 on the centrifugal weights actuate the locking ring 90 to slide the same forwardly in the axial direction. Thereupon, the synchronizing ring 92 is compressed. Continued axial movement of the locking ring 90 in the forward direction causes the teeth 91 thereof to mesh with the teeth 95 of the collar of the sun gear 44. The sun gear 44 is rotating at the same speed as the shaft 50, which has the sun gear 51 of the rear planetary gear 15 fixed thereto. Hence, the sun reactor gear 60 of the planetary gear 15 and the sun gear 51 of the planetary gear 15 are locked-up Accordingly, the drive shaft 12, the planet carrier 54, the sun gear 51, the sun reactor gear 60, and the intermediate shaft 50 rotate in unison. Now, the transmission 10 has a one to one drive ratio and is in high gear. There is no torque multiplication between the drive shaft 11 and the driven shaft 12.

Reference is now made to FIG. 7, which illustrates additional arrangements for shifting the transmission 10. Toward this end, a horizontally disposed cylinder 100 is mounted on a suitable transmission housing 101. An oil inlet port or opening 102 is formed in the cylinder 100. A conduit 103 connected to the pressure side of an engine oil pump, not shown, communicates with the cylinder 100 through the port 102 to supply oil under pressure within the cylinder 100.

Oil return ports 104–106 are formed in the cylinder 100. A conduit 107 communicates with the ports 104–106 and is connected to the engine crank case to return the used oil to the engine. Disposed within the cylinder 100 is a piston 108, which is mounted therein for reciprocating movement. Fixedly secured to the piston rod 108 for movement therewith are plungers 109 and 110. Also formed in the cylinder 100 are ports 111 and 112. A conduit 113 communicates with the port 111 and is connected with a down shift housing 115 that houses the actuating arrangement which shifts the transmission 10 from the drive condition to the low drive condition. Oil under pressure is transmitted to the housing 115 through the conduit 113.

Communicating with the port 112 is a conduit 116 that is connected with a housing 117 (FIG. 6) to supply oil under pressure to the housing 117. In the housing 117 is the actuating arrangement which actuates a brake band for the planetary gear 15 when the transmission 10 is to operate in reverse. From FIGS. 7, 7A–7D, it is observed that the plungers 109 and 110 control and direct the flow of oil under pressure from the cylinder 110 to the conduits 111 and 116.

Fixed to the piston rod 108 for rectilinear movement therewith is one end of a connecting rod 120 (FIG. 7). The other end of the connecting rod 120 is fixedly secured to one of a drive rod 121. The rod 121 is parallel to the piston rod 108 and travels in a reciprocating path. Through this arrangement, the rods 108, 121 and 120 move in unison. The manually operated shift on the wheel column or on the floor of the vehicle is linked to the connecting rod 120 for actuating the connecting rod 120 in response to movement to different transmission positions. The linkage is not shown, but is connected thereto by a rod 120a. Shift levers 122 and 123 are connected to the rod 121 at their free ends to be actuated thereby. The proximal ends of the levers 122 and 123 are pivotally attached to the transmission 10. The shift lever 122 is employed for the manual shift from neutral to drive and from drive to neutral. The shift lever 123 may be referred to as a park lever.

The shift lever 122 (FIGS. 7 and 8) at its proximal end is connected to a shifting block 125 to impart rotary movement thereto. Formed in the periphery of the curved surface of the shift block 125 are grooves 126. As shown in FIGS. 5 and 8, the shifting block 125 is disposed within a housing 127. Mounted on the housing 127 is a spring loaded ball detent 128 that tends to retain the shifting block 125 in an adjusted position. A screw 129 regulates the tension of the spring of the spring loaded ball detent 128.

Formed in the shifting block 125 are arcuate grooves 131 and 132 that join at location 133. Received by the grooves 131 and 132 is a flanged follower 135 of the shifting fork 65 (FIGS. 1, 5 and 8). When the lever 122 is actuated, the shift block 126 rotates therewith. The variation of the location of the follower 135 relative to the pivot of the shift lever 122 causes the shift fork 65 to move axially relative to the shaft 50. When the follower 135 is located at the junction 133 of the grooves 131 and 132, the shift from neutral to drive or drive to neutral for the transmission 10 takes place. As previously described, it is the shift fork 65 that imparts sliding axial movement to the sun reactor gear 60 relative to the shaft 50.

The shift lever 123 for parking actuates a pawl or dog 140 (FIG. 5), which is received by teeth 142 formed in a mating or locking gear 141 (FIGS. 1 and 5) that is fixed to the forward end of the planet carrier 54 of the planetary gear 15. When the dog 140 actuated by spring 140a is engaged with the teeth 142 of the mating gear 141, the transmission 10 is locked in parking condition.

As previously described, the shift levers 122 and 123 are pivoted in unison by the rod 121. In turn, the rod 121 moves in unison with the connecting rod 120 and the piston rod 108. Of course, the plungers 109 and 110 reciprocate with the piston rod 108.

When the manual shift lever for the transmission 10 is moved from the drive position to the neutral position, the piston rod 108 (FIG. 7) is moved by the connecting rod 120, but the plungers 109 and 110 thereon do not uncover any oil line. The park lever 123 moves, but it does not release the pawl 140 to engage the mating ring 141 of the planet carrier 54. FIG. 7A shows the location of the plungers 109 and 110 for the drive condition, while FIG. 7B shows the location of the plungers 109 and 110 for the neutral condition.

Continued movement of the manual shift lever to the reverse position does not move the shifting fork 65 from its neutral position (FIG. 8). While the parking lever 123 moves, it does not release the pawl 140 to engage the mating ring 141. However, the plungers 109 and 110 move under the movement of the rod 108 and action of the rod 120 to open a path for the flow of oil under pressure from the cylinder 100 through the port 112, into the conduit 116 and into the housing 117 (FIG. 6). (See FIG. 7C.) It is to be observed from FIG. 7b, which shows the neutral location for the plunger 109 and 110 that the plunger 110 blocks off any flow of oil under pressure from the cylinder 100 to the port 112.

Mounted in the cylindrical housing 117 is a spring loaded piston 142' (FIG. 6). The piston 142' projects out of the cylindrical housing 117 and engages a flange 143 on the movable end of a reverse wrap around brake band 144. The opposite end of the reverse brake band 144 is adjustably fixed in its location. The reverse brake band 144 encircles an internal ring gear 150 of the planetary gear 15.

When the shift lever is in the reverse position, oil under pressure is conducted from the cylinder 100 (FIG. 7C) into the conduit 116 (FIG. 7) and then into the housing 117 (FIG. 6). This action moves the piston 142' against the urgency of the spring thereof to tighten the reverse brake band 144 against the ring gear 150. As a consequence thereof, the ring gear 150 is locked and restrained from rotating.

When the shaft 50 (FIG. 1) is rotated in the manner previously described, the sun gear 51 rotates in the clockwise direction (FIG. 6). In turn, the pinion gears 52 and 53 rotate in the counterclockwise direction (FIG. 6), which mesh with the planet gears 55 and 56 to rotate the same in the clockwise direction (FIG. 6). The planet gears 55 and 56 are meshed with the locked internal ring gear 150. As the just-mentioned gears rotate, they turn the planet carrier 54 (FIG. 1) counterclockwise (FIG. 6) at a reduced speed. The planet carrier 54 then rotates the driven shaft 12 in the reverse direction.

Moving the manual shift lever to the parking position leaves the sun reactor gear 60 in the neutral position. The location of the sun reactor gear 60 is controlled by the shifting fork 65. However, the plungers 109 and 110 under the action of the rods 120 and 108 move rearwardly (FIG. 7D) in the cylinder 100 releasing the oil from the cylindrical housing 117 and redirecting the used oil over the return path to the engine crank case in the following manner: cylindrical housing 117, conduit 116, port 112, cylinder 100, port 105, and conduit 107. The piston 142' under its spring 158 is urged to its initial position and closes the cylindrical housing 117.

The just-described movement for the piston rod 108 and the rod 121 moves the park lever 123 and rotates a parking lever plate 159 to release the pawl 140 for engaging the teeth of the mating gear 141. The transmission 10 is now locked in parking position. By moving the manual shift lever out of the park position raises the pawl 140 and during the remaining positions other than park the pawl 140 remains disengaged from the mating gear 141 (FIG. 9).

When moving the manual shift lever from neutral to the drive position, the plungers 109 and 110 are moved by the rods 120 and 108 but do not open any oil lines (FIG. 7A). The only movement is the shifting fork 65 (FIGS. 1, 5, and 8) sliding the sun reactor gear 60 into meshing engagement with the one-way brake 45 by the teeth 61 of the sun reactor gear 60 meshing with the teeth 63 on the one-way brake 45 through the synchronizing ring 61a.

In moving the manual shift lever to low drive, the shifting fork 65 remains in position to maintain the transmission in the drive conditoin by the sun reactor gear 60 and the parking lever 123 does not release the pawl 140 to engage the mating gear 141. However, the rods 120 and 108 move the plungers 109 and 110 to the positions shown in FIG. 7 for low drive. In so doing, communication is established between the ports 102 and 111 of the cylinder 100. Oil under pressure now flows from the engine through the conduit 103, port 102, cylinder 100, port 111, conduit 113 and into the housing 115.

Mounted in the down shift housing 115 is a spring loaded piston rod 155 (FIGS. 1 and 7). The end of the piston rod 155 projecting out of the housing 115 engages a pivotally supported down shift lever 156. The piston 155 (FIG. 1) at its rod section includes a tubular rod 155a, which receives a solid rod 155b. It is the free projection of the solid rod 155b that engages the down shift lever 156. Interposed between the tubular rod 155a and the solid rod 155b is a spring 155c. A spring 155d continuously urges the tubular rod 155a and plungers integral therewith toward the coupling with the conduit 113.

When the transmission 10 is in drive, the forces or stresses on the gears, teeth and mating ports tend to hold them and lock them together. Hence, it would be difficult for the piston 155 to actuate the pivotal shift lever 156. To obviate this problem, it is desirable to temporarily stall the engine. The temporary or split second stalling of the engine, takes off instantly the forces and stresses on the gears, teeth and mating parts to enable the piston 155 to actuate the pivotal shift lever 156.

Toward this end, normally open electrical contacts 160 are connected to the distributor side of an ignition coil 161. One end of the normally open contacts is grounded. When the tubular piston rod section 155a of the piston rod 155 moves away from the coupling for the housing 115 under the urgency of oil under pressure, an enlarged diameter portion 155e thereof engages the switch 160 to close the same and to ground the ignition coil 161 temporarily. This action temporarily stalls the engine.

As a consequence thereof, the stress and load is now taken off the gears, teeth and mating parts. Thereupon, the spring tension from the spring 155c in the piston rod 155 causes a thrust on the rod section 155b to cause the piston 155 to actuate the pivotal down shift lever 156. When this occurs, the enlarged diameter portion 155e of the piston 155 advances beyond the contacts 160 to enable the spring thereof to return the contacts 160 to their normally open position and remove the ground from the coil 161. The engine is once again operating normally.

The down shift lever 156 includes an arcuate section 156a (FIG. 3) with pins 156b and 156c connected to the release ring 157. When the arcuate section 156a of the shift lever 156 is moved forwardly, the release ring 157 moves forward therewith over the expanded weights 85 (FIG. 1) and moving the locking ring 90 rearwardly. This action occurs because the arcuate section 156a of the shift lever 156 engages the centrifugal weights to return the same to their initial position. As a consequence thereof, the fingers 88 of the centrifugal weights 85 shift the locking ring 90 rearwardly. The teeth of the sun gear 60 becomes disengaged from the teeth of the locking ring 90. Now, the sun gear 44 is released from the sun gear 51 of the rear planetary gear 15 and the transmission 10 is in low drive.

If the shift lever remains in low drive position and the transmission 10 is held in second gear, then the vehicle is braking during down hill travel. When the manual shift lever is moved to the drive position, the plungers 109 and 110 (FIG. 7A) redirect the oil from the housing 115 and conduit 113 to the engine crank case through the ports 111 and 104 of the cylinder 100. The spring 155d (FIG. 1) returns the piston 155 to its original position in the housing 115. The transmission 10 remains in low drive until the accelerator pedal is temporarily released and the rear planetary gear 15 is locked up in a manner previously described. Leaving the vehicle in drive and coming to a stop with the engine idling, the fluid clutch 13 will have a 100% slippage and the centrifugal weight 74 and 85 will return to the positions shown in FIG. 1 under the urgency of the spring thereof. The planetary gears 14 and 15 will unlock and the vehicle will start again in low gear.

The operation of the automatic gear transmission 10 will now be described. When the manually operated shifting lever, not shown, is in the neutral position, the brake band 144 and the sun reactor gear 60 are in the position shown in FIG. 1. No oil under pressure is supplied to either the housing 115 or the housing 117 (FIGS. 7B, 7 and 6). Hence, the brake band 144 is not in engagement with the internal ring gear 150 of the planetary gear 150 and the sun reactor gear 60 of the planetary gear 15 is not locked to the one-way brake 45. When the sun reactor gear 60 is not locked with the one-way brake 45, the transmission 10 is out of gear.

With the engine operating, the drive shaft 11 is rotating in the clockwise direction (FIG. 2), which in turn rotates the shaft 30 through the fluid coupling or clutch 13.

By shifting the manually operated shift lever to drive, the shift fork 65 shifts the sun reactor gear 60 forwardly to lock with the one-way brake 45. The sun reactor gear 60 is held against counterclockwise rotation (FIGS. 4 and 6). No oil under pressure is supplied to either the housing 115 or the housing 117 (FIG. 7A).

While the speed of travel of the vehicle is below 15 miles per hour, the transmission 10 is at low gear. The drive shaft 11 rotates the shaft 30 through the fluid coupling 13. The power on the shaft 50 is transmitted from the shaft 30 with a torque multiplication through the planetary gear 14. The driven shaft 21 is driven by the planetary gear 15 with a torque multiplication. The shaft 50 transmits its power to the driven shaft 12 through the planetary gear 15.

After the speed of the vehicle reaches 15 miles per hour and the accelerator pedal is temporarily released for reversed power flow, the centrifugal weights 74 pivot radially outward to slide the locking ring 70 forward to mesh with the mating ring 77 of the planet carrier 43 of the planet gear 14. The planetary gear 14 is now locked up so that the components thereof rotate in unison. After the operator releases momentarily the accelerator pedal to obtain a reverse power flow, the sun reactor gear 60 of the planet gear 15 rotates clockwise. Hence, the sun gear 44 of the planetary gear 14 rotate in the clockwise direction. Upon the application of power, the sun reactor gear comes to rest and is held against counterclockwise rotation by the one-way brakes 45 and 46. The only multiplication of torque is through the rear planetary gear 15 and the transmission 10 is said to be in second.

After the vehicle reaches the speed of 25 miles per hour and the accelerator pedal is temporarily released for reversed power flow, the centrifugal weights 85 pivot radially outward and slide the locking ring 90 into meshing engagement with the teeth 95 on the collar of the sun gear 44. After the operator releases the accelerator pedal to establish temporarily a reverse power flow, the sun reactor gear 60, the one-way brake 45 and the one-way brake 46 rotate in unison. Now, the sun reactor gear 60 of the planetary gear 15 and the sun gear 51 of the planetary gear 15 are locked-up to rotate in unison. Therefore, the driven shaft 12, the planetary gear 15, the intermediate shaft 50 and the sun gear 44 of the planetary gear 14 rotate in unison. Now, the transmission 10 has a one to one drive ratio and is in high gear. There is no torque multiplication between the drive shaft 11 and the driven shaft 12.

When the manual shift lever is moved to the reverse position, the connecting rod 120 (FIG. 7) moves the piston rod 108 and the plungers 109 and 110 to the position shown in FIG. 7C. Hence, oil under pressure flows from the engine through the conduit 102, cylinder 100, conduit 116, and into housing 117. The oil under pressure in the housing 117 moves the piston 142' against the urgency of the spring 158 thereof to engage the brake band 144 with the internal ring gear 150 of the planetary gear 15. The ring gear 150 is now restrained from rotating. The planet gears 55 and 56 are meshing with the locked internal ring gear 150. As a consequence thereof, the planet carrier 54 turns counterclockwise (FIG. 6) at a reduced speed. The planet carrier 54 then rotates the driven shaft 12 in the reverse direction.

When the manual shift lever is moved to park, oil under pressure is not admitted to the cylinder 100 (FIG. 7D). Also, the brake band 144 is released. However, the connecting rod 120 actuates the parking lever 121 through the rod 121 to the extent that the pawl 140 (FIG. 5)

is released to engage the teeth of the mating gear 141. Now, the transmission 10 is locked in the parking condition. By moving the manual shift lever out of the park position raises the pawl 140 remains disengaged from the mating gear 141.

In moving the manual shift lever to low drive while the vehicle is in motion, the shifting fork 65 (FIGS. 1, 5 and 8) remains in position to maintain the transmission in the drive condition through the sun reactor gear 60. The connecting rod 120 moves the piston rod 108 to the position shown in FIG. 7. As a result thereof, oil under pressure flows through the conduit 103, into the cylinder 100, through the conduit 113 and into the housing 115. The oil under pressure entering the housing 115 moves the piston 155 (FIG. 1) causing the enlarged diameter portion 155e to engage the electrical switch 160. Thereupon, the coil 161 is temporarily grounded to momentarily stall the engine. The temporary or split second stalling of the engine removes the forces and stresses on the gears, teeth and mating parts to enable the piston 155 to actuate the pivotal shift lever 156. Now, the increased diameter portion 155e releases the electrical switch 160 to remove the ground from the coil 161, and the engine is operating normally once again.

When the arcuate section 156a of the shift lever 156 is moved forwardly by the thrust from the piston 155, the release ring 157 moves forwardly therewith over the expanded weights 85 to move the locking ring 90 rearwardly. The teeth of the sun gear 60 become disengaged from the teeth of the locking ring 90. Now, the sun gear 44 is released from the sun gear 51 of the rear planetary gear 15 and the transmission is in low drive.

When the manual shift lever is moved to the drive position, the plungers 109 and 110 (FIG. 7A) redirect the oil from the housing 115 and conduit 113 to the engine crankshaft through the cylinder 100. The pistons 155 return to its initial position under the urgency of the spring 155d. The transmission 10 remains in low drive until the accelerator pedal is temporarily released and the rear planetary gear 15 is locked up in a manner previously described.

Leaving the vehicle in drive and coming to a stop with the engine idling, the fluid coupling clutch 13 will have a 100% slippage and the centrifugal weights 74 and 85 will return to the positions shown in FIG. 1 under the urgency of the springs thereof. The planetary gears 14 and 15 will unlock and the transmission 10 is again in condition to be operated.

It is to be understood that variations and modifications of the embodiments of the invention disclosed herein may be resorted to without departing from the spirit of the invention and the scope of the appended claims.

Having thus described by invention, what I claim as new and desire to protect by Letters Patent is:

1. An automatic gear transmission for transmitting power from a drive shaft to a driven shaft comprising a planetary gearset including sun gear, means for rotating said sun gear, one-way brake means operatively associated with said sun gear to hold said sun gear against rotation in one direction, said sun gear being formed with a collar having teeth thereon, a locking ring disposed concentrically with said sun gear and adjacent the teeth on the collar thereof, said locking ring being rotatable with said one-way brake means and slidable in an axial direction, a plurality of centrifugal weights mounted on said one-way brake means adjacent said locking ring, and means for rotating said one-way brake means in another direction, said centrifugal weights being arranged to move radially outward in response to said one-way brake means rotating above a predetermined speed to move said locking ring into meshing engagement with said teeth on the collar of said sun gear.

2. An automatic gear transmission according to claim 1 wherein said planetary gearset includes a planet carrier, a locking gear carried by said planet carrier, a pawl disposed above said mating gear and adapted to move into or out of locking engagement with said locking gear, an arcuate parking plate disposed adjacent said pawl, and a shift lever connected to said parking plate for imparting rotary movement to said parking plate for moving said parking plate into engagement with said pawl for releasing said pawl for locking engagement with said locking gear and to remove said pawl from engagement with said locking gear.

3. An automatic gear transmission for transmitting power from a drive shaft to a driven shaft comprising a planetary gearset including sun gear, means for rotating said sun gear, one-way brake means operatively associated with said sun gear to hold said sun gear against rotation in one direction, said sun gear being formed with a collar having teeth thereon, a locking ring disposed concentrically with said sun gear and adjacent the teeth on the collar thereof, said locking ring being rotatable with said one-way brake means and slidable in an axial direction, a synchronizing ring interposed between said teeth on the collar of said sun gear and said locking ring concentric therewith, a plurality of centrifugal weights mounted on said one-way brake means adjacent said locking ring, and means for rotating said one-way brake means in another direction, said centrifugal weights being arranged to move radially outward in response to said one-way brake means rotating above a predetermined speed to move said locking ring into meshing engagement with said synchronizing ring and to further move said locking ring into meshing engagement with the teeth on the collar of said sun gear.

4. An automatic gear transmission for transmitting power from a drive shaft to a driven shaft comprising a planetary gearset including sun gear, means for rotating said sun gear, one-way brake means operatively associated with said sun gear to hold said sun gear against rotation in one direction, said sun gear being formed with a collar having teeth thereon, a locking ring disposed concentrically with said sun gear and adjacent the teeth on the collar thereof, said locking ring being rotatable with said one-way brake means and slidable in an axial direction, a plurality of centrifugal weights mounted on said one-way brake means adjacent said locking ring, a reactor gear disposed adjacent said one-way brake means concentric therewith and slidable in an axial direction, said one-way brake means being formed with teeth thereon, means for moving said reactor gear into meshing engagement with said teeth on said one-way brake means, and means for rotating said reactor gear for imparting rotary movement to said one-way brake means in another direction, said centrifugal weights being arranged to move radially outward in response to said one-way brake means rotating above a predetermined speed to move said locking ring into meshing engagement with said teeth on the collar of said sun gear to lock said sun reactor gear with said sun gear through said one-way brake means.

5. An automatic gear transmission for transmitting power from a drive shaft to a driven shaft comprising a ring gear, a first shaft connected to said ring gear to impart rotation thereto, a first planet carrier mounted concentrically with said ring gear, a second shaft connected to said first planet carrier for rotation therewith, first planet gears carried by said first planet carrier and disposed in meshing engagement with said ring gear, a mating ring mounted on said first planet carrier for rotation therewith, a first sun gear mounted on said second shaft for free rotation relative thereto and disposed in meshing engagement with said first planet gears, a first plurality of centrifugal weights mounted on said first sun gear, a first locking ring mounted on said first sun gear for rotation therewith and slidable in an axial direction relative to said second shaft, said first centrifugal weights being disposed adjacent said first locking ring and being arranged to move radially outward in response to said first sun gear rotating above a predetermined rotary speed to move said first locking ring into meshing engagement with said mating ring, whereby said first and second shafts rotate in unison, one-way brake means operatively associated with said first sun gear to hold said first sun gear against rotation in one direction, said first sun gear being formed with a collar having teeth thereon, a second locking ring disposed concentrically with said first sun gear and adjacent the teeth on the collar thereof, said second locking ring being rotatable with said one-way brake means and slidable in an axial direction, a second plurality of centrifugal weights mounted on said one-way brake means adjacent said second locking ring, a reactor gear disposed adjacent said one-way brake means concentrically therewith and slidable in an axial direction, said one-way brake means being formed with teeth thereon, means for moving said reactor gear into meshing engagement with said teeth on said one-way brake means, second planet gears disposed in meshing engagement with said reactor gear, a second planet carrier supporting said second planet gears for rotation, a second sun gear fixed to said second shaft for rotation therewith to impart rotary movement to said reactor gear through said second planet gears, and a third shaft connected to said second planet carrier for rotation therewith, the rotation of said reactor gear imparts rotation to said one-way brake means, said second centrifugal weights being arranged to move radially outward in response to said one-way brake means rotating above a predetermined speed to move said second locking ring into meshing engagement with said teeth on the collar of said first sun gear to lock said third shaft with said second shaft.

6. An automatic gear transmission for transmitting power from a drive shaft to a driven shaft comprising a planetary gearset including sun gear, means for rotating said sun gear, one-way brake means operatively associated with said sun gear to hold said sun gear against rotation in one direction, said sun gear being formed with a collar having teeth thereon, a locking ring disposed concentrically with said sun gear and adjacent the teeth on the collar thereof, said locking ring being rotatable with said one-way brake means and slidable in an axial direction, a plurality of centrifugal weights mounted on said one-way brake means adjacent said locking ring, means for rotating said one-way brake means in another direction, said centrifugal weights being arranged to move radially outward in response to said one-way brake means rotating above a predetermined speed to move said locking ring into meshing engagement with said teeth on the collar of said sun gear, and means operative for moving said locking ring out of meshing engagement with said teeth on the collar of said sun gear.

7. An automatic gear transmission for transmitting power from a drive shaft to a driven shaft comprising a planetary gearset including sun gear, drive means for rotating said sun gear, one-way brake means operatively associated with said sun gear to hold said sun gear against rotation in one direction, said sun gear being formed with a collar having teeth thereon, a locking ring disposed concentrically with said sun gear and adjacent the teeth on the collar thereof, said locking ring being rotatable with said one-way brake means and slidable in an axial direction, a plurality of centrifugal weights mounted on said one-way brake means adjacent said locking ring, means for rotating said one-way brake means in another direction, said centrifugal weights being arranged to move radially outward in response to said one-way brake means rotating above a predetermined speed to move said locking ring into meshing engagement with said teeth on the collar of said sun gear, means operative for momentarily disabling said drive means, and means operative for moving said centrifugal weights radially inward while said drive means is momentarily disabled for moving said locking ring out of meshing engagement with said teeth on the collar of said sun gear.

8. An automatic gear transmission for transmitting power from a drive shaft to a driven shaft comprising a planetary gearset including sun gear, drive means for rotating said sun gear, one-way brake means operatively associated with said sun gear to hold said sun gear against rotation in one direction, said sun gear being formed with a collar having teeth thereon, a locking ring disposed concentrically with said sun gear and adjacent the teeth on the collar thereof, said locking ring being rotatable with said one-way brake means and slidable in an axial direction, a plurality of centrifugal weights mounted on said one-way brake means adjacent said locking ring, means for rotating said one-way brake means in another direction, said centrifugal weights being arranged to move radially outward in response to said one-way brake means rotating above a predetermined speed to move said locking ring into meshing engagement with said teeth on the collar of said sun gear, disabling means including an electrical switch operative for temporarily disabling said drive means, actuating means operative for moving said centrifugal weights radially inward while said drive means is temporarily disabled for moving said locking ring out of meshing engagement with said teeth on the collar of said sun gear, and a piston operative for first temporarily operating said disabling means and then operating said actuating means.

9. An automatic gear transmission as claimed in claim 8 and including a housing for said piston, a cylinder having an outlet port communicating with said housing and an inlet port, means for conducting fluid under pressure into said cylinder through said inlet port, a piston in said cylinder controlling the flow of fluid under pressure into said housing through said outlet port, and means controlling the location of said piston in said cylinder to admit fluid under pressure into said housing for imparting movement to said piston in said housing for temporarily operating said disabling means and for operating said actuating means.

References Cited

UNITED STATES PATENTS

| | | | |
|---|---|---|---|
| 1,909,191 | 5/1933 | Stafford | 74—752 |
| 2,198,072 | 4/1940 | Banker | 74—752 |
| 2,223,614 | 12/1940 | Hopkins | 74—752 |
| 2,235,420 | 3/1941 | Cory | 74—752 X |
| 2,262,747 | 11/1941 | Banker | 74—752 X |
| 2,262,959 | 11/1941 | Osborne | 74—752 |
| 2,382,088 | 8/1945 | Moffitt | 74—752 |
| 2,891,421 | 6/1959 | Grattan | 74—752 |
| 3,164,034 | 1/1965 | Kelley | 74—752 |

FOREIGN PATENTS 524,883  8/1940  Great Britain.

ROBERT M. WALKER, *Primary Examiner.*

DAVID J. WILLIAMOWSKY, *Examiner.*

J. R. BENEFIEL, *Assistant Examiner.*